United States Patent [19]
Margolin

[11] Patent Number: 4,748,680
[45] Date of Patent: May 31, 1988

[54] COLOR DOCUMENT SCANNER

[75] Inventor: George D. Margolin, Newport Beach, Calif.

[73] Assignee: Photon Devices, Ltd., Newport Beach, Calif.

[21] Appl. No.: 894,612

[22] Filed: Aug. 8, 1986

[51] Int. Cl.$^4$ .......................... H04N 1/46; G06K 7/10; G06K 9/20

[52] U.S. Cl. ........................................ 382/65; 358/75; 350/96.24; 355/1; 355/4

[58] Field of Search ...................... 382/65, 67; 358/75, 358/901; 350/96.24–26.27; 355/1, 4

[56] References Cited

U.S. PATENT DOCUMENTS

| | | | |
|---|---|---|---|
| 4,413,276 | 11/1983 | Hertz et al. | 358/75 |
| 4,490,740 | 12/1984 | Moriguchi | 358/75 |
| 4,674,834 | 6/1987 | Margolin | 355/1 |

Primary Examiner—James J. Groody
Assistant Examiner—Michael D. Parker
Attorney, Agent, or Firm—Marmorek, Guttman & Rubenstein

[57] ABSTRACT

A color document scanner is achieved using three optical fiber bundles. Each bundle is linear at the entrance face and merely gathered at the exit face. The linear ends are abutted against one another and aligned across a document to be scanned. The (three) exit faces are abutted against one or more associated sensor arrays with, for example, red, green, and blue filters interposed between the fiber bundles and the sensor array(s). The sensor arrays are operative not only to relate the positions of fibers in the entrance and exit faces of the respective bundles, but also to organize the associated color information with the appropriate scanned line segment.

9 Claims, 2 Drawing Sheets

COLOR DOCUMENT SCANNER

FIELD OF THE INVENTION

This invention relates to color document scanners and more particularly to such scanners employing fiber optic bundles.

BACKGROUND OF THE INVENTION

My copending application Ser. No. 581,085 filed Feb. 17, 1984 and assigned to the assignee of the present application describes a document scanner employing a fiber optic bundle. (The above-identified patent application is incorporated herein by reference.) The bundle has a linear entrance face and a rectangular exit face. The positions of the fibers in the two faces not only are unknown but they bear no predetermined relationships to one another. In other words, the fiber bundle is non-coherent. The fibers at the entrance face, however, are constrained into a linear geometry and the fibers of the exit face are merely gathered randomly into the proper geometry to mate with the desired sensor array or arrays.

The fibers at the exit face are energy coupled in fixed positions with respect to a sensor array which is conveniently an optical random access memory (RAM) or a random access charge injection device (CID). The bundle is made coherent electronically.

Electronic coherence is achieved during an initialization process by moving a beam of light, small compared to the fiber size, in increments along a path at the entrance face which intersects all the fibers in sequence. A software program is operative to store all the addresses of the sensors illuminated for each position of the beam. The software also is operative to determine when maxima occur in the number of illuminated sensors as the beam is moved. The address of a single sensor is selected out of the group of illuminated sensors for each maximum. The sequence of addresses thus identified is reduced to one sensor address per maximum and their address is taken as corresponding to the exit position of a fiber.

In normal operation, a permanent memory is adapted to interrogate only the single sensor at the stored address for each fiber, in the sequence in which it was stored, each time a line of the document is scanned. Thus, only a small subset of the sensor array is addressed leading to high speed operation. It is clear that a non-coherent fiber optic bundle with a sensor array and a permanent memory with the initialized information as described is capable of faithfully reconstructing entrance pixel positions.

BRIEF DESCRIPTION OF AN ILLUSTRATIVE EMBODIMENT OF THE INVENTION

Such a device as described in the above-mentioned copending patent application is adapted for color herein by employing a plurality of such fiber optic arrays in close proximity astride a document to be copied. One fiber bundle is used for each desired color. For the customary color organization, red, green and blue filters are positioned at the exit ends of first, second, and third bundles respectively. The exit ends can be associated with individual sensor arrays. Alternatively, all the exit ends may be energy coupled to a common sensor array defined by a single optical RAM or CID chip.

DETAILED DESCRIPTION

Figure 1:
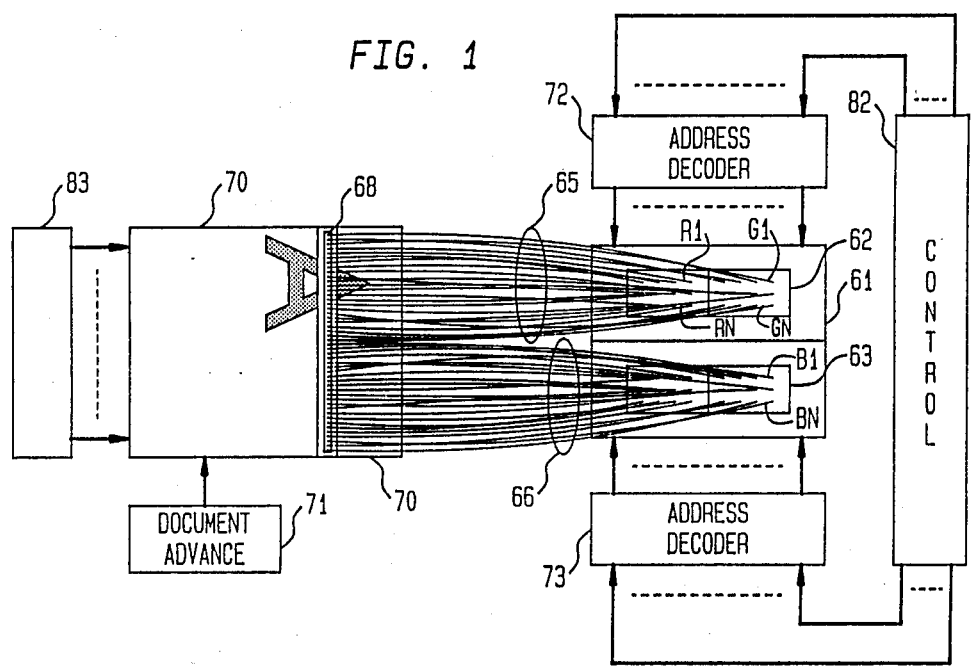
FIG. 1 is a schematic diagram of a color document scanner in accordance with this invention.
Figure 2:
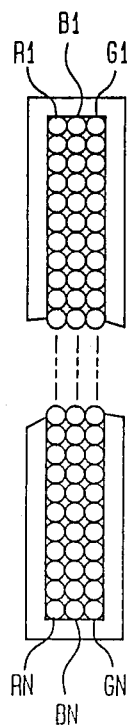
FIGS. 2 and 6 are enlarged front views of the entrance face of alternative fiber optic subsystem portions of the scanner of FIG. 1.

FIG. 1 shows schematically an arrangement for scanning a document in accordance with this invention. The arrangement includes a RAM chip 61 divided into two sections 62 and 63 as is available commercially. Sections 62 and 63 are mated with first, second, and third randomly-bundled fiber arrays. FIG. 2 shows the linear ends of the three fiber arrays designated R1—RN, G1—GN, and B1—BN for red, green and blue respectively. The bundled ends of the respective arrays are abutted against different areas of chip 61 as shown in FIG. 1.

The fiber optic bundle for each color may be made with the exit end of the bundle abutted against or imaged upon a dedicated sensor array. Alternatively, the three arrays may have their respective exit faces abutted against a corresponding dedicated area of a single sensor array. For this latter embodiment, and particularly for color applications, a random access CID of adequate size would be preferred.

Initialization of the fiber entrance face as shown in FIG. 2 is carried out in a manner described in the above-identified patent application. Specifically, a slit is employed to pass white light into a narrow area small compared to a fiber size. The slit extends across three fibers one from each of the red, green and blue sets of fibers. The dedicated areas of chip 61 are interrogated separately to determine if a maximum group of illuminated sensors has occurred each time the position of the slit is incremented. A selected address out of each (maximum) group of illuminated sensors is stored for each of the areas corresponding to a color.

The sequence of addresses for each of the chip (color) areas is stored separately in a permanent memory in order to later interrogate only the stored sequence for each such area each time a scan period occurs. The sequences for the respective colors are, for example, concatenated during each scan period so that the sequence corresponding to red (as an example) is interrogated first followed by the sequence corresponding to green. Thereafter, the sequence corresponding to blue is applied. In each instance operation is entirely analogous to that described in the above-identified patent application.

Figure 3:
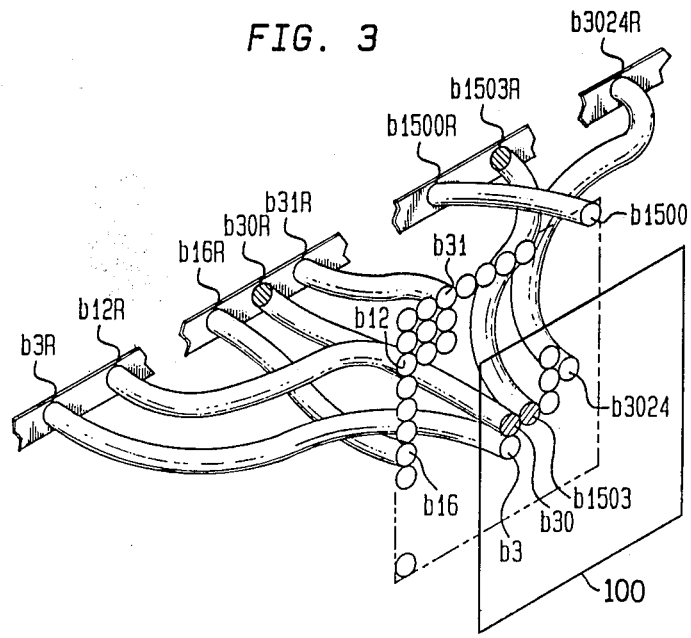
FIG. 3 is a schematic diagram of a portion of the fiber optic subsystem of the scanner of FIG. 1, and FIGS. 4 and 5 are schematic block diagrams of portions of the electronic circuit organization of the scanner of FIG. 1.

FIG. 3 shows a single fiber optic bundle, say for the color red. The non-linear end of the bundle includes a red color filter 100 of a dichroic material evaporated onto the exit face of the bundle. Of course, the second and third bundles of FIGS. 1 and 2 would, similarly, include like-positioned green and blue filters (not shown).

Figure 4:
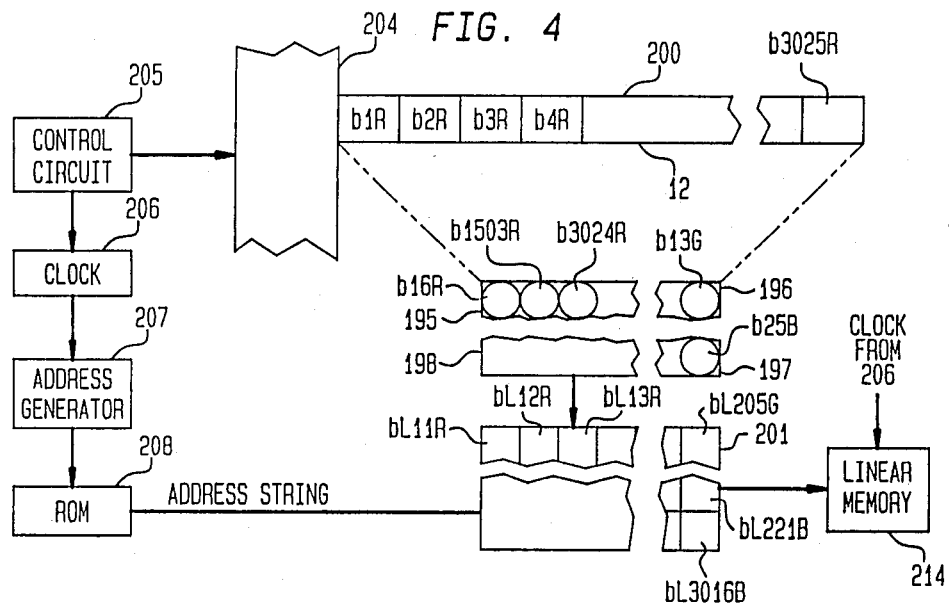

FIG. 4 shows the linear (entrance) ends of the fibers of the bundles as lines of squares 200 designated b1R . . . b3025R for bits 1 through 3025 red. The FIG. also shows the exit face 195, 196 and 197 organized into respective areas of a square area corresponding to sensor arrays defined on a single chip such as a CID. Thus, all the bits (fibers) in the "red" fiber optic array are shown to the upper left portion 195 of a chip. The linear ends of the fibers corresponding to blue and green arrays could also be represented by this manner. They are not shown in the figure to avoid confusion. The exit ends of the fibers in the green and blue arrays are positioned to correspond to the upper right portion 196 and lower right portion 197 of the second array, respectively. The lower left portion 198 of the array is unused. The organization corresponds to that shown in FIG. 1.

The sensor array is designated 201 in FIG. 4. The fiber size is chosen conveniently to correspond to a plurality of sensors of the sensor array as is fully disclosed in the above-mentioned copending patent application. Specifically for a 256K (256,000) bit chip, the fiber size is chosen of a size to correspond to say sixteen sensors. Thus, 3025 fibers cover an area of the sensor array corresponding to 48400 sensors and three such chips cover an area corresponding to fewer than 150,000 sensors of the 256,000 sensors. Consequently, three separate areas of a single sensor chip can be used. Of course, three separate smaller chips can be used also as is clear.

The electronics for the operation of the scanner is analogous to that disclosed in the above-mentioned patent application incorporated herein by reference. Specifically, FIG. 4 shows a block 204 representing a mechanical apparatus for moving a document such as 70 of FIG. 1. The mechanical apparatus is operated under the control of a control circuit 205. Circuit 205 is clocked by clock 206 and is adapted to increment the document a distance equal to the width of the three color lines (i.e., the width of 3 fiber rows as shown in FIG. 2), a distance of about 6 mils in one embodiment.

Figure 5:
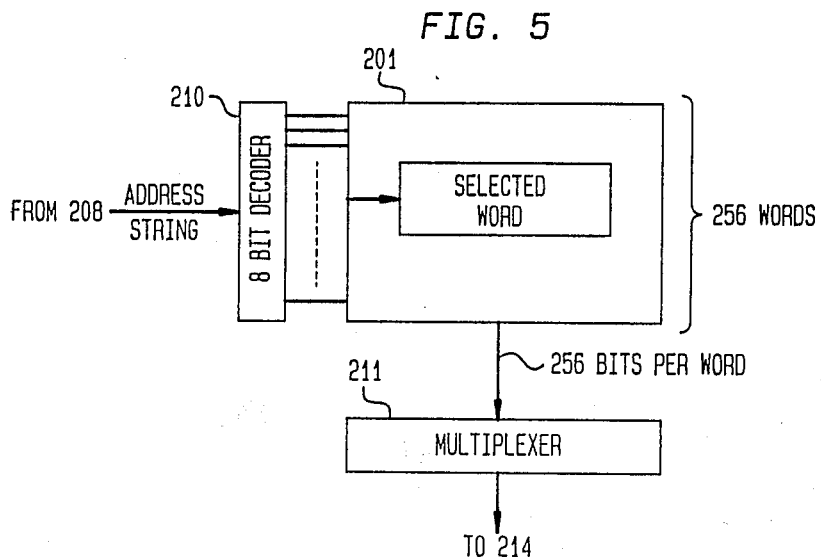

Clock 206 also enables the generation of a string of sensor addresses corresponding to the sequence b1R . . . b3025R b1G . . . b3025G . . . b1B . . . b3025B of the linear (entrance) ends of the fibers. To this end, the scanner of FIG. 4 includes an address generator 207, the output of which is connected to a read only memory (ROM) 208. ROM 208 responds, in a well understood manner, to generate the address string corresponding to the sequences of fibers at the entrance face as stored during initialization. The address string is applied to sensor array 201 by means of eight (8) bit decoder 210, as shown in FIG. 5.

The decoder is operative to select a particular word in the sensor array. Each time a clock pulse occurs, the linear end of the fiber array scans a next segment of the document and ROM 208 applies an address string to decoder 210. Each address of the address string selects a word or block of bit addresses in arra 201 and applies the 256 bits of the selected word or block of bit addresses to multiplexer (MUX) 211. (In FIG. 4, particular blocks in the sensor array are designated by the notation bL followed by an identifying number and letter found to indicate the color.) MUX 211 is a 256 to 1 MUX and is operative to apply a binary 1 or 0 to linear memory 214 of FIG. 4 depending upon whether the selected block of bit addresses is illuminated or not in the instant scan period. Linear memory 214 also receives clock pulses from clock 20 for incrementing to a next set of positions. The reason why blocks are addressed rather than individual locations is the sensor array is explained in the above-identified patent application incorporated herein by reference.

Figure 6:
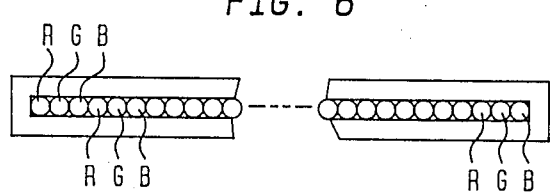

In a second illustrative embodiment, the fibers at the linear end (entrance face) can be alternated RGB as shown in FIG. 6 at the exit faces, the "red", "green", and "blue" bundles are gathered, polished and coated with the corresponding filter material. The entrance faces are energy coupled (epoxy'd or imaged) onto corresponding sensor arrays or portions of a sensor array. In these embodiments, operation is exactly as disclosed in the above-mentioned copending patent application.

A color scanner thus is achieved by placing color filters adjacent the exit (or entrance) faces of three fiber optic bundles which are energy coupled to sensor arrays. The sensor arrays are initialized to relate the fiber ends in the entrance and exit faces of each of the bundles so that non-coherent bundles can be used as well as coherent bundles of fibers.

The color scanner has been described in terms of red, green, and blue filters. It is to be understood that other colors such as yellow, magenta and cyan can be used as well.

Further, it is advantageous to employ sensor arrays such as CID's because such arrays are inherently capable of providing grey scale which enhances color reproduction. An optical RAM is inherently binary but can be made to exhibit pseudo grey scale properties which are quite useful. Such grey scale operation of an optical RAM is disclosed in my copending application Ser. No. 752,501 now U.S. Pat. No. 4,702,552, filed July 3, 1985 and also assigned to the assignee of the present application.

The illumination of the document for scanning is disclosed in the above-mentioned copending application. Illumination can be accomplished via a separate fiber bundle (not shown) or by the appropriate use and positioning of a lamp or lamps. Transmission or reflection modes are both possible and can be useful for different tasks.

The scanner of FIG. 1 can be operated to produce three color images of a document simultaneously. Moreover, the document need not be incremented in distances equal to the three abutting arrays. The documents need be moved only a distance dictated by the desired resolution and each of the three images may be captured separately exactly as described in my copending application Ser. No. 581,085 now U.S. Pat. No. 4,674,834. It should be clear, for example, that a single fiber optic array with a red filter would produce a "red" image of the document scanned. Arrays with green and blue filters would similarly produce green and blue images. The operation need not be different just because the three arrays produce images during a single document scan operation. The three images can be superimposed electronically to produce a single color document.

What is claimed is:

1. Apparatus for scanning a document, said apparatus comprising first, second, and third optical fiber bundles, each of said bundles having an entrance face and an exit face, first, second, and third color filter means associated with said first, second, and third optical fiber bundles, respectively, means for maintaining said entrance faces in energy coupled proximity to a document to be scanned, first, second and third sensor array means energy coupled to said first, second and third exit faces for storing associated color information responsive to a first signal, permanent store means coupled to the sensors of each of said array means also responsive to said first signal for interrogating said sensors of said array means, said sensors being determined during a preceding initialization operation.

2. Apparatus in accordance with claim 1 wherein said fibers of said first, second, and third entrance face are interleaved along a single line astride said document.

3. Apparatus in accordance with claim 1 wherein said fibers of said first, second, and third entrance faces are arranged adjacent one another in consecutive lines astride said document.

4. Apparatus in accordance with claim 2 wherein said first, second, and third sensor means are defined in a single sensor array.

5. Apparatus in accordance with claim 3 wherein said first, second, and third sensor array means are defined in first, second, and third sensor arrays respectively.

6. Apparatus in accordance with claim 1 wherein each of said bundles is non-coherent.

7. In combination, a first fiber optic bundle having a linear entrance face and a bundled exit face, a first color filter adjacent said exit face, a sensor array adapted to be illuminated by radiation exiting said exit face, said sensor array having a plurality of sensors adapted to receive radiation from each of said fibers, and means connected to said sensor array for interrogating a first subset of said sensors including at least one of said plurality of sensors illuminated by the radiation from each of said fibers, said subset including a number of sensors less than the number in said array, said subset being determined during a preceding initialization procedure.

8. A combination in accordance with claim 7 also including second and third fiber bundles having second and third color filters adjacent respective exit faces.

9. A combination in accordance with claim 8 wherein said sensor array is organized into first, second, and third positions adapted to receive radiation from the fibers of said first, second, and third exit faces respectively, and said means connected includes means for interrogating second and third subsets including at least one of said plurality of sensors illuminated by radiation from each of said fibers in said second and third bundles.

* * * * *